Jan. 9, 1940.   L. G. BRAZIER ET AL   2,186,446
ELECTRIC CABLE
Filed Nov. 28, 1936   3 Sheets-Sheet 1
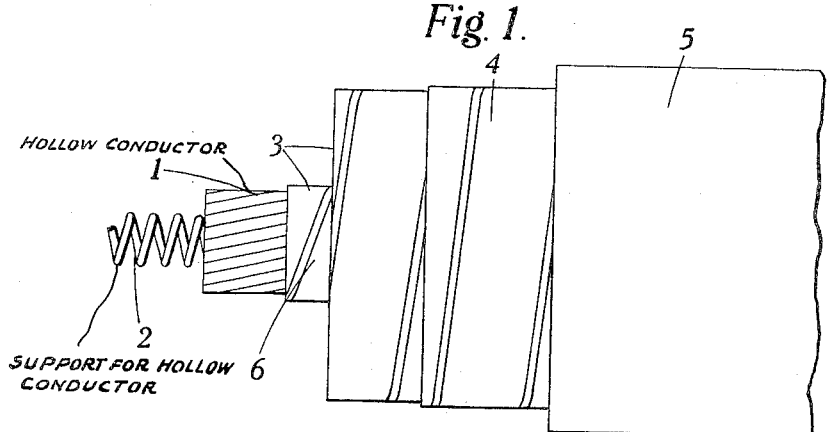
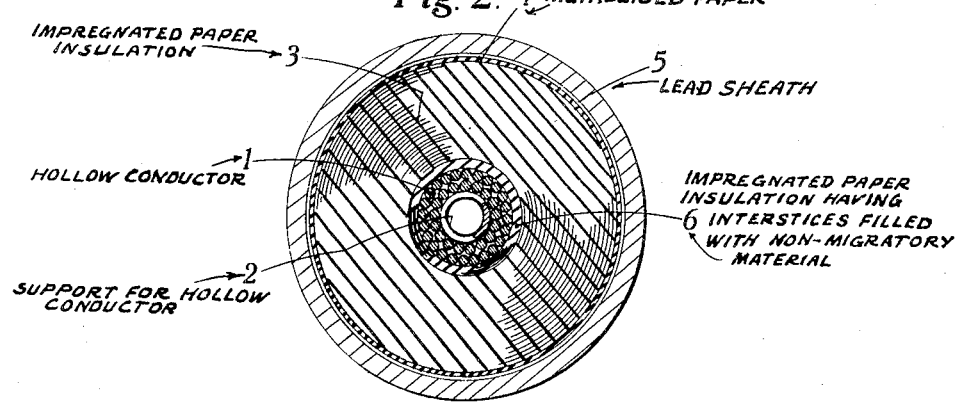
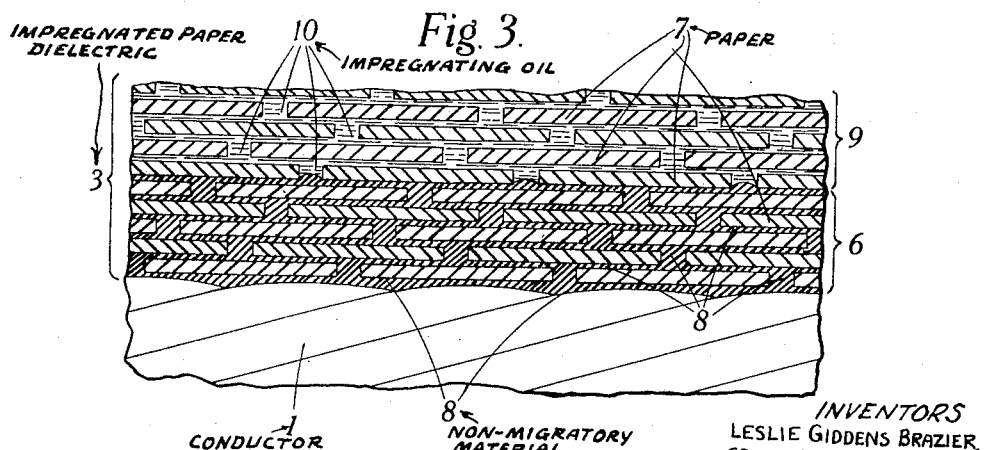

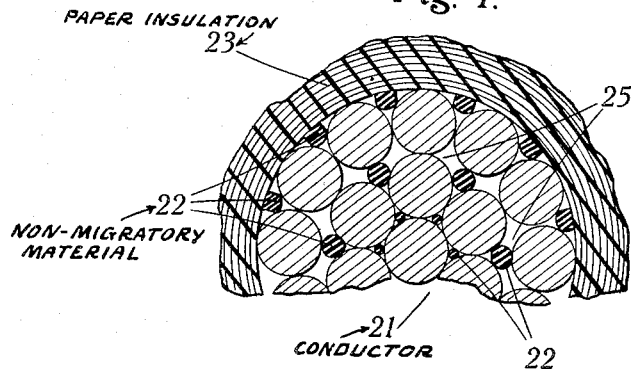
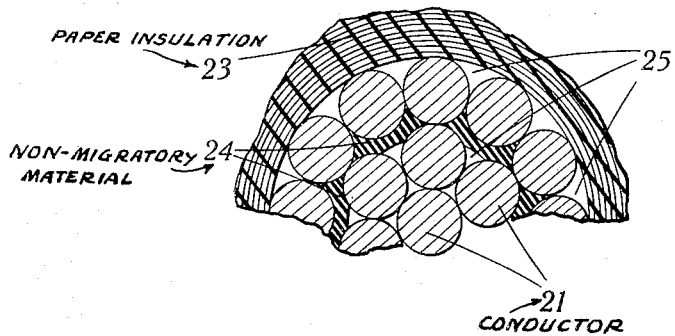
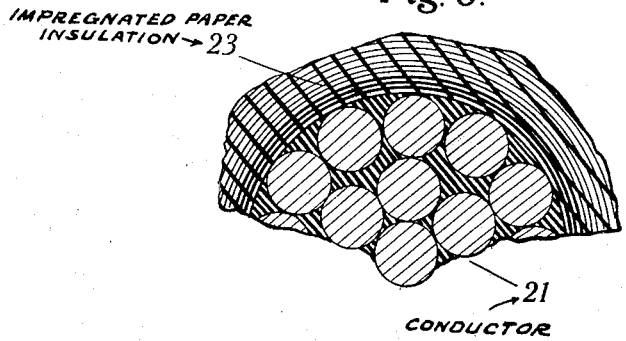

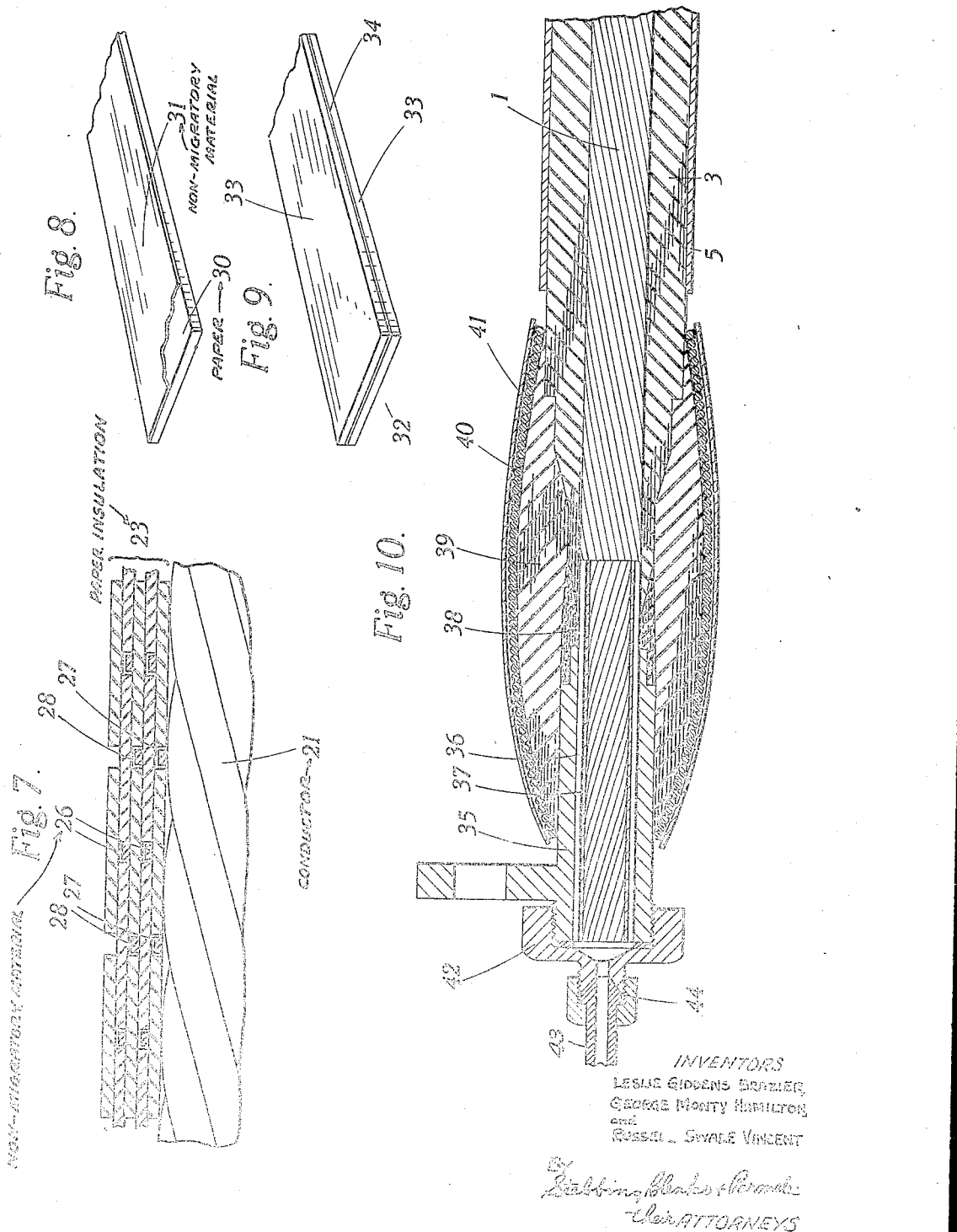

Patented Jan. 9, 1940

2,186,446

UNITED STATES PATENT OFFICE 2,186,446

ELECTRIC CABLE

Leslie Giddens Brazier, George Monty Hamilton, and Russell Swale Vincent, London, England, assignors to Callender's Cable and Construction Company, Limited, London, England, a British company Application November 28, 1936, Serial No. 113,150
In Great Britain December 11, 1935

12 Claims. (Cl. 174—25)

This invention relates to insulated electric cables of the kind comprising a conductor insulated by a laminated body of paper impregnated with a mobile or viscous insulating fluid, built up on the conductor. The use of such a laminated dielectric has the advantage that the cable is sufficiently flexible to permit it to be manufactured in long lengths and reeled in the factory, conveyed to the installation site and there unreeled, without damage to the insulation. It has the disadvantage, however, that there are necessarily formed interstices between the surface of the conductor and the inner surface of the paper dielectric and also within the body of the dielectric itself. Initially these are all filled with the mobile or viscous insulating fluid with which the cable is impregnated. Such fluid has a much larger coefficient of thermal expansion than have the other materials embodied in the cable structure. Under working conditions the cable undergoes repeated cycles of temperature changes. During the heating part of each cycle the fluid in the interstices expands whereas the latter do not, at any rate to the same extent. Consequently the fluid is forced to migrate and unless special provision is made to accommodate the change in volume and to force back fluid into the dielectric body during the cooling part of the cycle small gaseous or vacuous spaces, usually termed voids, are inevitably produced in the dielectric body or between that body and the conductor. This action is naturally more pronounced in the case of a cable having a conductor composed of a number of small wires stranded together and having the interstices in such conductor also filled with insulating fluid. Hitherto it has not been possible to avoid the disadvantage of migration of the impregnating medium filling the interstices without reducing the flexibilty of the cable to such an extent that it is useless except in short lengths and perhaps in certain special circumstances.

Until recently it was generally assumed that all voids, whether located between the conductor and the dielectric or within the dielectric itself usually constituted the initial cause of breakdown but recent research has shown that voids bounded by the surface of the conductor on the one side and by the dielectric material on the other side are more conducive to breakdown than those within the dielectric.

It is the object of the present invention to provide an improved cable of the type set forth in which the tendency to the formation of voids, particularly voids between the conductor and the dielectric, is very considerably reduced, if not entirely eliminated, without the aid of devices for compensating for changes in volume of the material filling the interstices and for returning the material to its normal position during the cooling part of a temperature cycle and without substantially reducing the flexibility of the cable.

In the improved cable constructed in accordance with our invention the interstices between the surface of the conductor and the inner surface of the dielectric body of paper and, preferably, also the interstices in the inner part of that body instead of being full of mobile or viscous insulating liquid, are filled with an insulating material which is tough and adheres to the walls of the interstices, that is, to the adjacent conductor surface or paper surface as the case may be. The material is capable of being deformed under stresses arising from changes in temperature within the working range of the cable but possesses tenacity and internal cohesion to a degree sufficient to ensure its return to normal when such stresses are removed. Such a material is not susceptible to migration and, consequently, the interstices in the inner part of the cable always remain filled, even after repeated cycles of temperature changes. The absence of free impregnating fluid (by which term is meant fluid that is not so bound to the structure of the paper that it cannot be removed without the aid of a solvent and/or evaporation) in the inner part of the cable presents an additional advantage. Since this inner part is the part where the heating effect is most pronounced, not only is the total volume of free fluid in the cable reduced but the total increase in volume of such fluid per unit change in temperature of the conductor is reduced to a still greater extent. The tendency for voids to be formed in the outer part of the dielectric surrounding this inner part is therefore greatly reduced.

The invention will be further described with reference to the accompanying drawings wherein:

Figure 1 is an elevation of an impregnated paper insulated single core cable constructed in accordance with the present invention;

Figure 2 is a cross-sectional view of the cable shown in Figure 1;

Figure 3 is a diagrammatic, fragmental, longitudinal cross-section on a greatly enlarged scale in a radial direction of the cable shown in Figure 1;

Figure 4 is an enlarged fragmental cross-section of a paper insulated cable containing non-migratory material located in the conductor thereof;

Figure 5 is a corresponding view of a similar cable to that shown in Figure 4 but containing non-migratory material introduced in the form of a wrapping;

Figure 6 is a corresponding view of the cable shown in Figures 4 and 5 after completion of the swelling of the non-migratory material;

Figure 7 is a fragmental longitudinal cross-section on a similar scale to Figure 3 of a paper insulated cable containing non-migratory material in the interstices between the paper tapes;

Figure 8 is a fragmental view of a paper strip coated with a film of non-migratory material;

Figure 9 is a corresponding view of a sandwich strip consisting of paper and non-migratory material;

Figure 10 is a longitudinal cross-section of an impregnated paper insulated cable fitted with a connecting gland.

The cable shown in Figures 1 and 2 of the drawings, comprises a stranded hollow conductor 1 supported by a wire helix 2, an impregnated laminated body of insulation 3 built up on the conductor by helical wrappings of paper tape, a wrapping 4 of metallised paper surrounding the dielectric 3, and an enclosing lead sheath 5. The interstices within the conductor, those between the conductor and the inner surface of the dielectric, and those in the inner part 6 of the dielectric are filled with insulating material of the kind above described (hereinafter for convenience termed "non-migratory material," or simply "material"). This filling of the interstices is more clearly shown in Figure 3 of drawings, which is a diagrammatic, fragmental, longitudinal cross-section, on a greatly enlarged scale in a radial direction, of the cable shown in Figure 1. The interstices in the inner part 6 of the dielectric 3 which are produced by the necessary clearance between the successive turns in each layer of paper 7 and the interstices between the turns of successive layers in this part are shown filled with non-migratory material 8. Those in the outer part 9 are shown filled with impregnating oil 10. Naturally any other interstices present in the inner portion 6 of the dielectric, for instance, the larger of the interstices within the paper itself, are also filled with non-migratory material. These comparatively small interstices are, however, omitted from the drawing for the sake of clearness.

The insulating material employed to fill the interstices in the inner part of the cable will generally be a material which, at temperatures within the normal working range of the cable, is in the form of a tough jelly. Bodies of this nature are readily deformable under stresses but possess a considerable amount of elasticity tending to make them return in some degree to their original form. Examples of materials that are suitable and possess the desired physical properties are given in the following two paragraphs.

The insulating material employed to fill the interstices in the inner part of the cable may consist wholly or mainly of pure rubber. In some cases it may be desirable to incorporate with the rubber a rubber softener. Suitable softeners for this purpose are, for example, mineral oil and stearic acid but other substances, which are well known in the rubber industry as softeners, may be used providing they do not appreciably lower the dielectric properties of the rubber or of the impregnating oil or compound with which they may come into contact. The amount of softener to be employed will be insufficient to reduce the tenacity and internal cohesion of the rubber to a value which will permit the rubber to migrate as a result of cycles of temperature changes, that is to say, it will not be enough to destroy the tough jelly-like nature of the rubber. Naturally the rubber will be attacked by the impregnating oil or compound with which it comes into contact and the boundary of the two materials will be a colloidal solution of one in the other. This is not objectionable as it does not result in any deterioration of the electrical properties of the oil or compound and does not result in the dispersion of the rubber barrier to an appreciable extent.

Alternatively, the insulating material with which the interstices are filled may be a suitable plastic. Plastics that are suitable will be those which, either alone or when admixed with a suitable plasticizer, possess the desired physical properties indicated above at the normal operating temperatures of the cable and can be softened to a sufficient extent to enable them to be introduced into the interstices below temperatures that are harmful to the impregnated body of dielectric. Of the plastics already known the following are considered satisfactory when admixed with suitable plasticisers and are mentioned by way of example:

Polyacrylic acid and derivatives.
Aldehyde-phenol condensation products, e. g., the material sold under the registered trade-mark "Bakelite."
Polybasic acid-polybasic alcohol compounds, e. g., the materials sold under the registered trade-mark "Glyptal."
Polyvinyl derivatives, e. g., polyvinyl acetate.
Coumaron resin.
Indene resin.
Urea and thiourea-aldehyde condensation products.
Polystyrene.
Oxidised rosin.
Cellulose esters and ethers, e. g., cellulose acetate and benzyl cellulose.
Stearine pitch.
Shellac.

Examples of suitable plasticisers are:
Triphenyl phosphate.
Tricresyl phosphate, and organic liquids containing no free hydroxyl groups which boil above 180° C. Examples are:
Chlorinated naphthalene.
Chlorinated diphenyl.
Diphenyl naphthalene.
Diphenyl ether.
Tetrahydronaphthalene.

Any one of these plasticisers is applicable to any of the plastics mentioned above but it will be appreciated that of the known plasticisers, some may be suitable only for use with certain of the resinous materials.

A mixture of this kind is able to wet oil or compound impregnated paper with which it comes into contact and to form over the paper a layer impervious to attack by such fluid owing to the presence of the plastic component of the mixture.

The following mixtures of resinous materials and plasticisers have been found satisfactory and are mentioned by way of example, all parts being by weight:

Example 1: Parts
 Low viscosity vinyl acetate _____ 100
 Tetrahydronaphthalene _____ 20
Example 2:
 Low viscosity vinyl acetate _____ 100
 Diphenyl ether _____ 20
Example 3:
 Low viscosity vinyl acetate _____ 100
 Diphenyl naphthalene _____ 25
Example 4:
 Polystyrene _____ 100
 Tetrahydronaphthalene _____ 50
Example 5:
 Polystyrene _____ 100
 Diphenyl ether _____ 50
Example 6:
 Polystyrene _____ 100
 Diphenyl naphthalene _____ 55

There are several ways in which the material may be introduced into the interstices between the conductor and the dielectric body of paper and into the interstices in the inner part of that body. Of these several ways some, as is pointed out when describing them, are naturally more suitable for use with some materials than with others. The cable may, for instance, be impregnated in the ordinary way with an insulating fluid of any desired composition and degree of viscosity and the free impregnating fluid in the part of the cable comprising the conductor and the inner part of the surrounding body of paper insulation be displaced by the jelly material by means of a grouting process in which the material is forced into the cable, preferably from one end thereof through a passage in the conductor which is in continuous or frequent communication with the exterior thereof. The passage may be comprised by the interstices in a stranded conductor but preferably a small channel, such as is shown in Figures 1 and 2, is provided for the purpose. To facilitate the grouting operation the material will generally have its tenacity and internal cohesion temporarily reduced by any suitable means. Any of the specified mixtures of resinous materials and plasticisers set forth in the preceding paragraph may be introduced in this way when heated to a slight extent above the maximum working temperature of the cable and in general, where the material is formed of a mixture of two component substances, a resinous material and a plasticiser, such a mixture may be introduced by a grouting process if the constituent parts thereof are such as to give a mixture that becomes softened to a sufficient extent to permit it to be extruded when heated to a slight extent above the maximum normal working temperature of the inner part of the cable. Rubber with which has been incorporated a softening agent may also be inserted in this way, a temporary reduction of its internal cohesion and tenacity being obtained by raising its temperature and/or by mastication.

Alternatively the non-migratory material may be introduced as a solid at a convenient stage in the manufacture of the cable and subsequently be treated with a liquid which will cause it to swell and fill the interstices between the surface of the conductor and the inner surface of the dielectric body of paper and preferably those in the inner part of the dielectric also. In this case the material in its initial condition may be disposed within the interstices of the conductor or some of them or in the grooves between the outer wires of the conductor or in both places, before the paper insulation is applied.

Figure 4 shows an enlarged fragmental cross-section of a cable in which the material has been introduced by incorporating one or more filaments 22 of the material during the operation of stranding the conductor 21 and Figure 5 shows a similar view of a cable in which the material has been introduced in the form of a wrapping 24 between the first and second layers of the stranded conductor 21. Figure 6 shows the same cables after the completion of the swelling process. Instead of inserting the material in thread or tape form it may be forced into the interstices 25 of the stranded conductor by an extrusion process; in this case the swelling will cause the material to penetrate farther into the dielectric since the conductor interstices are initially filled. Alternatively or additionally, the material may be disposed in its initial condition within the laminated body of paper 23 surrounding the conductor. This may be effected in several ways. For instance as shown in Figure 7 (which is a fragmental, longitudinal cross-section on a similar scale to Figure 3) by inserting threads or strips 26 of the material in its initial condition in the helical spaces 27 between the conductor 21 and the inner surface of the dielectric 23 and also in the interstices 28, between successive layers of paper, as the process of lapping on the paper proceeds. Alternatively the introduction of the material in its initial condition may be effected by building up the inner part of the dielectric of pre-treated paper, that is paper containing and/or carrying a quantity of the material, for example, paper strip 30 coated in any suitable manner with a film 31 of the material in its initial condition, as shown on an enlarged scale in Figure 8 or a sandwich strip 32, consisting, as shown on a similar scale in Figure 9, of two strips of paper 33 separated by a film 34 of the initial material. These threads 26 and films 31 and 34 may be produced by any suitable process and will be of such a thickness that under the action of the swelling agent they will swell into and fill the interstices 27, 28 in the manner shown in Figure 3. The initial size of the threads or the thickness of the film used will naturally depend upon the extent of the swelling action and on the size of the interstices, which latter depend upon the thickness of the paper and the type of lapping adopted. Generally the swelling agent will consist of or be comprised in the fluid employed to impregnate the paper dielectric. These methods of introducing the material are especially suitable in the case where the material consists wholly or mainly of pure rubber and the swelling agent is the mineral oil with which the paper is impregnated.

The non-migratory filling material may also be applied simultaneously with the lapping on of the paper insulation in cases where the material is capable of being temporarily softened. For instance, the paper may be loaded with it in the same way as described in the preceding paragraph with reference to Figures 8 and 9, and carry it on to the conductor where it is pressed into the interstices as the lapping proceeds. If no swelling takes place the thickness of the film with which the paper if loaded will, in this case, be governed by the size of the interstices. Any of the mixtures specified in Examples 1–6 inclusive may be introduced in this way if applied at a suitable temperature. Where the filling material selected is one that can be rendered sufficiently fluid at a reasonable temperature, the lapping may be performed in a bath of the heated material. For this purpose a lapping machine of the type in which the cable rotates about its own axis will be employed; such a machine is described in the specification of U. S. Patent No. 1,591,736. Naturally the part of the lapping operation carried out in this manner may be terminated when desired and the remaining part (if any) of the lapping operation may take place in a bath of the fluid used to impregnate the outer part of the cable or, as a separate operation, in a lapping machine of the ordinary kind. This method of introduction not only enables the interstices in the inner part of the cable but also those in the outer part to be filled, if required, with the special non-migratory insulating material.

Where the conductor is a stranded conductor and the method of filling the interstices outside the conductor does not also result in filling of the interstices within the conductor it will in general be preferable to take precautions to maintain the interstices within the conductor free of fluid to avoid the generation of a positive pressure sufficient to displace the jelly material from the interstices between the conductor and the insulation.

When the method of application by forcing in is employed, the forcing operation may take place either before or after the cable is furnished with its impervious protective sheathing, which is generally of lead or a lead alloy. If the forcing operation takes place after the sheath is applied, the latter is preferably made a loose fit on the insulated conductor, as shown in Figure 2, in order to accommodate the impregnating fluid displaced by the injection of the non-migratory material employed to fill the interstices. In cases where the accommodation space within the sheath is not provided or is not sufficient for the surplus impregnating fluid displaced, the latter is permitted to escape through one or more openings in the sheath which are subsequently closed.

By forcing in the non-migratory material at a temperature somewhat above the maximum temperature under which the cable will operate and using a material of which the tenacity and internal cohesion increase considerably as the material cools or by using a material of which the tenacity and internal cohesion increase after a period of time, the pressure built up in the material forced into the cable may be retained if the applied pressure is maintained until these characteristics have increased to the desired value. By this we mean that when the material forced into the cable sets under the applied pressure it becomes a solid or quasi-solid body under what is known in mechanical engineering as a state of initial stress, which in this case is pressure, and it remains in this state of pressure. In this way it is possible to obtain for the inner part of the dielectric the known advantages in electric performances resulting from the use of pressure, without requiring the use of means and appliances which are ordinarily necessary in known forms of pressure cables, to ensure the maintenance of the dielectric under pressure.

To build up and retain pressure in the material in the interstices it is not essential to use the forcing in method. It is also obtained when the material, for instance rubber, is applied to the conductor and subsequently caused to swell. To a lesser degree this effect may be obtained where the material is pressed into place as the process of lapping on the paper tapes proceeds.

The operation of forcing in the material via the conductor may be carried out in the manner described below: Both ends of the impregnated cable are connected to pipes either by special glands or by poultices of insulation applied over the ends of the cable, Figure 10 of the drawings shows in longitudinal cross-section an example of a special connecting gland fitted to the end of a cable. Briefly, the gland comprises a tubular ferrule 35 which is slipped over the bared end of the stranded conductor 1 and soldered to the outer layer of wires 36 thereof, a tubular liner 37 being inserted between the outer layer and the inner part of the conductor to prevent solder from penetrating the inner part of the conductor and blocking the longitudinal channels between the wires thereof. Extrusion of the grouting material through the part of the conductor adjacent the end of the ferrule 35 is prevented by a light lapping 38 of oil silk and a surrounding tightly applied lapping 39 of varnished cambric tape or the like which may be applied in conjunction with a solution of shellac so that the whole mass will set into a mechanically strong body. This poultice is mechanically reinforced to withstand the bursting force of the pressure applied during the grouting process, by a lapping 40 of bronze or other wire of high tensile strength which is given longitudinal rigidity by longitudinal strips 41 soldered on at intervals. The ferrule is closed by a removable end cap 42 to which the pipe 43 is detachably secured by a union joint 44. One of the pipes 43 is connected to a vessel containing the material in a temporarily softened state and the other is left open. It will generally be preferable to increase the temperature of the cable to a moderate degree, for instance, by passing an electric current through the conductor. Pressure is then applied to the material in the vessel to force material out of the vessel and along the conductor. When the material is expelled from the other end, the pipe at that end is closed. The application of pressure is continued so as to cause the material to move radially outward through the conductor and the adjacent paper dielectric, forcing before it the impregnating fluid. This is continued until the interstices between the conductor and the paper dielectric and, preferably, those in the inner part of the dielectric also, are filled with the material. When penetration has taken place to the desired extent, the pressure is reduced sufficiently to prevent further penetration and when the material has acquired the desired degree of internal cohesion and tenacity sufficient to prevent loss of the pressure built up therein, the application of pressure is discontinued and the pipes are removed. The value of the pressure to be applied will depend mainly upon the particular non-migratory material with which it is desired to fill the interstices. For instance, when the material used is one of the mixtures specified in Examples 1-6 inclusive, a pressure of 300 lbs. per square inch is satisfactory. The time taken will naturally depend upon the length and type of cable and on the radial depth of penetration required.

From the above description of the invention it will be realised that the aim of the applicants is to fill up with a material that is not susceptible to migration the interstices between the conductor and the laminated body of paper insulation directly surrounding it, and preferably, also the interstices in the inner part of such body, without increasing the dimensions of such interstices, thus providing a cable which has a dielectric consisting as far as possible of impregnated paper but which is free from any tendency for voids conducive to breakdown to be formed therein.

What we claim as our invention is:

1. In an electric cable comprising a conductor, a laminated body of paper impregnated with insulating liquid built up on said conductor and an impervious sheathing enclosing said conductor and said laminated body, an insulating material, filling the interstices between the surface of the said conductor and the inner surface of said laminated body, which does not dissolve in the impregnating liquid to form a true solution, and which is tough and adherent to the walls of the interstices and capable of being deformed under stresses arising from changes in temperature within the working range of the cable but possesses tenacity and internal cohesion to a degree sufficient to ensure its return to normal when such stresses are removed.

2. In an electric cable comprising a conductor, a laminated body of paper impregnated with insulating liquid built up on said conductor, an impervious sheathing enclosing said conductor and said laminated body, an insulating material, filling the interstices between the surface of said conductor and the inner surface of said laminated body and also the interstices in the inner part of said laminated body, which does not dissolve in the impregnating liquid to form a true solution, and which is tough and adherent to the walls of the interstices and capable of being deformed under stresses arising from changes in temperature within the working range of the cable but possesses tenacity and internal cohesion to a degree sufficient to ensure its return to normal when such stresses are removed.

3. In an electric cable comprising a conductor, a laminated body of paper impregnated with insulating liquid built upon said conductor, an impervious sheathing enclosing said conductor and said laminated body, an insulating material, filling the interstices between the surface of said conductor and the inner surface of said laminated body, which is in the form of a jelly possessing high internal cohesion and consisting mainly of pure rubber.

4. In an electric cable comprising a conductor, a laminated body of paper impregnated with insulating liquid built up on said conductor and an impervious sheathing enclosing said conductor and said laminated body, an insulating material, filling the interstices between the surface of said conductor and the inner surface of said laminated body and also the interstices in the inner part of said laminated body, which is in the form of a jelly possessing high internal cohesion and consisting mainly of pure rubber.

5. In an electric cable comprising a conductor, a laminated body of paper impregnated with insulating liquid built up on said conductor, an impervious sheathing enclosing said conductor and said laminated body, an insulating material, filling the interstices between the surface of said conductor and the inner surface of said laminated body, which comprises at least one plastic which does not dissolve in the impregnating liquid to form a true solution admixed with a plasticiser, the mixture being, at normal cable operating temperatures, a tough jelly that adheres to the walls of the interstices and is capable of being deformed under stresses arising from changes in temperature within the working range of the cable but possesses tenacity and internal cohesion to a degree sufficient to ensure the return of the material to normal, when such stresses are removed and, at temperatures below those that are harmful to the paper forming said body, capable of being softened sufficiently to permit the material to be introduced into the interstices.

6. In an electric cable comprising a conductor, a laminated body of paper impregnated with insulating liquid built up on said conductor and an impervious sheathing enclosing said conductor and said laminated body, an insulating material, filling the interstices between the surface of said conductor and the inner surface of said laminated body and also the interstices in the inner part of said laminated body, which comprises at least one plastic which does not dissolve in the impregnating liquid to form a true solution admixed with a plasticizer, the mixture being, at normal cable operating temperatures, a tough jelly that adheres to the walls of the interstices and is capable of being deformed under stresses arising from changes in temperature within the working range of the cable but possesses tenacity and internal cohesion to a degree sufficient to ensure the return of the material to normal, when such stresses are removed and, at temperatures below those that are harmful to the paper forming said body, capable of being softened sufficiently to permit the material to be introduced into the interstices.

7. In an electric cable comprising a conductor, a laminated body of paper impregnated with insulating liquid built up on said conductor and an impervious sheathing enclosing said conductor and said laminated body, an insulating material, filling the interstices between the surface of said conductor and the inner surface of said laminated body, which does not dissolve in the impregnating liquid to form a true solution, and which is tough and adherent to the walls of the interstices and capable of being deformed under stresses arising from changes in temperature within the working range of the cable but possesses tenacity and internal cohesion to a degree sufficient to ensure its return to normal when such stresses are removed and is retained by its inherent properties in a state of compression.

8. In an electric cable comprising a conductor, a laminated body of paper impregnated with insulating liquid built up on said conductor and an impervious sheathing enclosing said conductor and said laminated body, an insulating material, filling the interstices between the surface of said conductor and the inner surface of said laminated body, which does not dissolve in the impregnating liquid to form a true solution, and which is tough and adherent to the walls of the interstices and capable of being deformed under stresses arising from changes in temperature within the working range of the cable but possesses tenacity and internal cohesion to a degree sufficient to ensure its return to normal when such stresses are removed and is retained in a state of compression brought about by permitting the tenacity and internal cohesion to increase whilst the material is maintained under an applied pressure.

9. In an electric cable comprising a conductor, a laminated body of paper impregnated with insulating liquid built up on said conductor and an impervious sheathing enclosing said conductor and said laminated body, an insulating material, filling the interstices between the surface of said conductor and the inner surface of said laminated body, which does not dissolve in the impregnating liquid to form a true solution, and which is tough and adherent to the walls of the interstices and capable of being deformed under stresses arising from changes in temperature within the working range of the cable but possessing tenacity and internal cohesion to a degree sufficient to ensure its return to normal when such stresses are removed and of a character such that it expands to a state of compression in situ and is retained in the expanded state.

10. An electric cable comprising a conductor, a composite dielectric surrounding said conductor and a liquid-tight sheath enclosing said dielectric, said composite dielectric comprising an outer portion consisting of a laminated body of paper and of insulating liquid in the interstices in said body, and an inner portion which adheres strongly to the surface of the conductor and to the inner surface of the outer portion and consists of a mass of insulating material which, at temperatures within the normal working range of the cable, is in the form of a tough jelly which does not dissolve in the impregnating liquid to form a true solution and of at least one helix of impregnated paper tape embedded in said mass.

11. An electric cable comprising a conductor, a composite dielectric surrounding said conductor and a liquid-tight sheath enclosing said dielectric, said composite dielectric comprising an outer portion consisting of a laminated body of paper and of insulating liquid in the interstices in said body, and an inner portion which adheres strongly to the surface of the conductor and to the inner surface of the outer portion and consists of a mass of insulating material and of at least one helix of impregnated paper tape embedded in said mass, said insulating material comprising at least one plastic, which does not dissolve in the impregnating liquid to form a true solution, admixed with a plasticizer and the mixture being, at temperatures within the normal working range of the cable, in the form of a tough jelly.

12. An electric cable comprising a conductor, a composite dielectric surrounding said conductor and a liquid-tight sheath enclosing said dielectric, said composite dielectric comprising an outer portion consisting of a laminated body of paper and of insulating liquid in the interstices in said body, and an inner portion which adheres strongly to the surface of the conductor and to the inner surface of the outer portion and consists of a mass of insulating material which, at temperatures within the normal working range of the cable, is in the form of a tough jelly which does not dissolve in the impregnating liquid to form a true solution and which is retained by its inherent properties in a state of compression, and of at least one helix of impregnated paper tape embedded in said mass.

LESLIE GIDDENS BRAZIER.
GEORGE MONTY HAMILTON.
RUSSELL SWALE VINCENT.